(12) United States Patent
Perucca et al.

(10) Patent No.: US 9,682,675 B2
(45) Date of Patent: Jun. 20, 2017

(54) BLIND SPOT MONITOR ARRANGEMENT FOR A VEHICLE BUMPER

(71) Applicant: Flex-N-Gate Corporation, Urbana, IL (US)

(72) Inventors: Steven Perucca, Clinton Township, MI (US); John Chiang, Farmington Hills, MI (US); Mark Clark, Shelby Township, MI (US); Paul Martini, Belle River, CA (US)

(73) Assignee: FLEX-N-GATE CORPORATION, Urbana, IL (US)

( * ) Notice: Subject to any disclaimer, the term of this patent is extended or adjusted under 35 U.S.C. 154(b) by 0 days.

(21) Appl. No.: 14/841,554

(22) Filed: Aug. 31, 2015

(65) Prior Publication Data
US 2017/0057441 A1    Mar. 2, 2017

(51) Int. Cl.
*B60R 19/48*    (2006.01)

(52) U.S. Cl.
CPC .................. *B60R 19/483* (2013.01)

(58) Field of Classification Search
CPC .................................................... B60R 19/483
See application file for complete search history.

(56) References Cited

U.S. PATENT DOCUMENTS

| 4,072,334 A | 2/1978 | Seegmiller et al. |
| 4,413,856 A | 11/1983 | McMahan et al. |
| 5,269,574 A | 12/1993 | Bhutani et al. |
| 6,669,251 B2 | 12/2003 | Trappe |
| 8,690,206 B1 * | 4/2014 | Yamasaki ................. B60S 1/56 248/205.1 |
| 9,132,791 B2 * | 9/2015 | Yamasaki |
| 9,260,071 B2 * | 2/2016 | Murray, Jr. ............. B60R 21/01 |
| 9,315,146 B2 * | 4/2016 | Purks ....................... B60Q 1/34 |
| 2004/0108737 A1 | 6/2004 | Evans et al. |
| 2010/0102577 A1 | 4/2010 | Ginja et al. |
| 2013/0219039 A1 * | 8/2013 | Ricci ................... H04L 43/0876 709/223 |
| 2014/0111950 A1 * | 4/2014 | Yamasaki |

FOREIGN PATENT DOCUMENTS

EP    2380781    10/2011

* cited by examiner

*Primary Examiner* — Lori L Lyjak
(74) *Attorney, Agent, or Firm* — Foley & Lardner LLP

(57) ABSTRACT

The a blind spot monitor arrangement for a truck bumper includes a polymeric bumper reinforcement having a blind spot monitor, a substantially horizontal surface, a substantially vertical face and a lower reinforcement arm. The lower reinforcement arm is substantially parallel to the substantially parallel horizontal surface. The lower reinforcement arm is integral to and connecting a lower end of the rear face to the lower end of the right face. A blind spot monitor is further mounted to the integrated sensor bracket and a bumper cover encloses the blind spot monitor and the polymeric bumper reinforcement.

14 Claims, 5 Drawing Sheets

BLIND SPOT MONITOR ARRANGEMENT FOR A VEHICLE BUMPER

TECHNICAL FIELD

The present disclosure relates to a blind spot monitor arrangement for a vehicle bumper which provides for improved performance, styling flexibility, lower cost, ease of manufacturing, increased strength, improved energy absorption, and lower weight. The present disclosure particularly relates to blind spot monitors for truck bumpers which are body-on-frame vehicles.

BACKGROUND

Bumper systems for modern passenger vehicles continue to evolve with respect to functional aspects as well as aesthetics. Despite this evolution, it is an ongoing issue for drivers to be able to observe a region near the vehicle in the adjacent lane. This area is referred to as a "blind spot." This area is generally the angles between 90 degrees and 170 degrees from the forward direction of the vehicle. The right and left side blind spots are a source of numerous accidents when a driver makes a turn or a lane change and does not see another vehicle in the blind spot.

The most common solution to the problem of blind spots has been to use mirrors to aid the operator of the vehicle in determining whether obstacles are present in a blind spot. Such mirrors have been made in a variety of shapes and mounted in various locations to provide the operator with the greatest ability to detect obstacles in particular blind spots. For example, it is commonplace today to see a concave mirror mounted to the right side of a vehicle aimed at the right side blind spot. Blind spot monitors are useful to drivers because they help alert the driver when a vehicle is in the driver's blind spot in the adjacent lane.

However, blind spot monitors have a sensitive electromagnetic radiation emitting from the outer face which cannot interact with metal in order to operate properly. Moreover, due to the blind spot monitor's sensitive nature, the blind spot monitor must also be protected from impact by debris. In cars, blind spot monitors are affixed to the inside surface of the plastic bumper fascia in order for the car to accurately identify an obstacle in the vehicle's blind spot. Cars are generally always implementing plastic bumper fascias and therefore, this arrangement for the blind spot monitor is feasible in a car.

However, in trucks, bumper structures are usually metal and trucks, unlike cars, are body on frame vehicles. Where a metal structure is implemented, it is undesirable to mount the blind spot monitor on the metal structure due to the sensitive nature of the blind spot monitor. Furthermore, in the case where a plastic bumper fascia is used on a truck, the plastic bumper fascia moves relative to the vehicle frame and therefore, it is undesirable to mount the blind spot monitor on the plastic bumper fascia due to variable relative movement and inaccuracy that may result of such a mounting arrangement.

Moreover, customers typically want an integrated solution that looks well designed. It is typically not an acceptable solution to merely mount additional components onto the exterior of existing systems due to increased cost, complexity and manufacturing time. Failure to provide a well-integrated solution can also result in quality problems due to the integration of a sensitive blind spot monitor into a bumper assembly when the vehicle is a body-on-frame vehicle. Therefore, a blind spot monitor arrangement for a truck bumper is desired which resolves the issues identified above.

SUMMARY

The a blind spot monitor arrangement for a truck bumper is provided which optimizes polymeric materials to achieve desired blind spot monitoring performance on a truck and yet meet design requirements while reducing the number of components and reducing assembly costs. The a blind spot monitor arrangement for a truck bumper includes a polymeric bumper reinforcement having a blind spot monitor, a substantially horizontal surface, a substantially vertical face and a lower reinforcement arm. The substantially horizontal surface including a rear portion which includes a horizontal flange and the adjacent to the horizontal flange, the substantially horizontal surface including upstanding integral ribs formed in a portion of the substantially horizontal surface. The substantially vertical face is integral to the substantially horizontal surface and the substantially vertical face includes vertical ribs formed on a rear face of the reinforcement and an integrated sensor bracket formed on an outer side face of the reinforcement. The lower reinforcement arm is substantially parallel to the substantially parallel horizontal surface. The lower reinforcement arm is integral to and connecting a lower end of the rear face to the lower end of the right face. A blind spot monitor is mounted to the integrated sensor bracket of the polymeric bumper reinforcement. The bumper cover encloses the blind spot monitor and the polymeric bumper reinforcement.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Embodiments disclosed herein relate to blind spot monitor arrangement 10 for a truck (body-on-frame) vehicle such that the vehicle can accommodate a blind spot monitor 50. The present disclosure provides for improved performance with respect to detecting an object in a vehicle's blind spot as well as improved styling flexibility, lower cost, ease of manufacturing, increased strength, improved energy absorption, and lower weight due to the implementation of the polymeric bumper reinforcement 14 which is adapted to receive the blind spot monitor 50.

Figure 1:
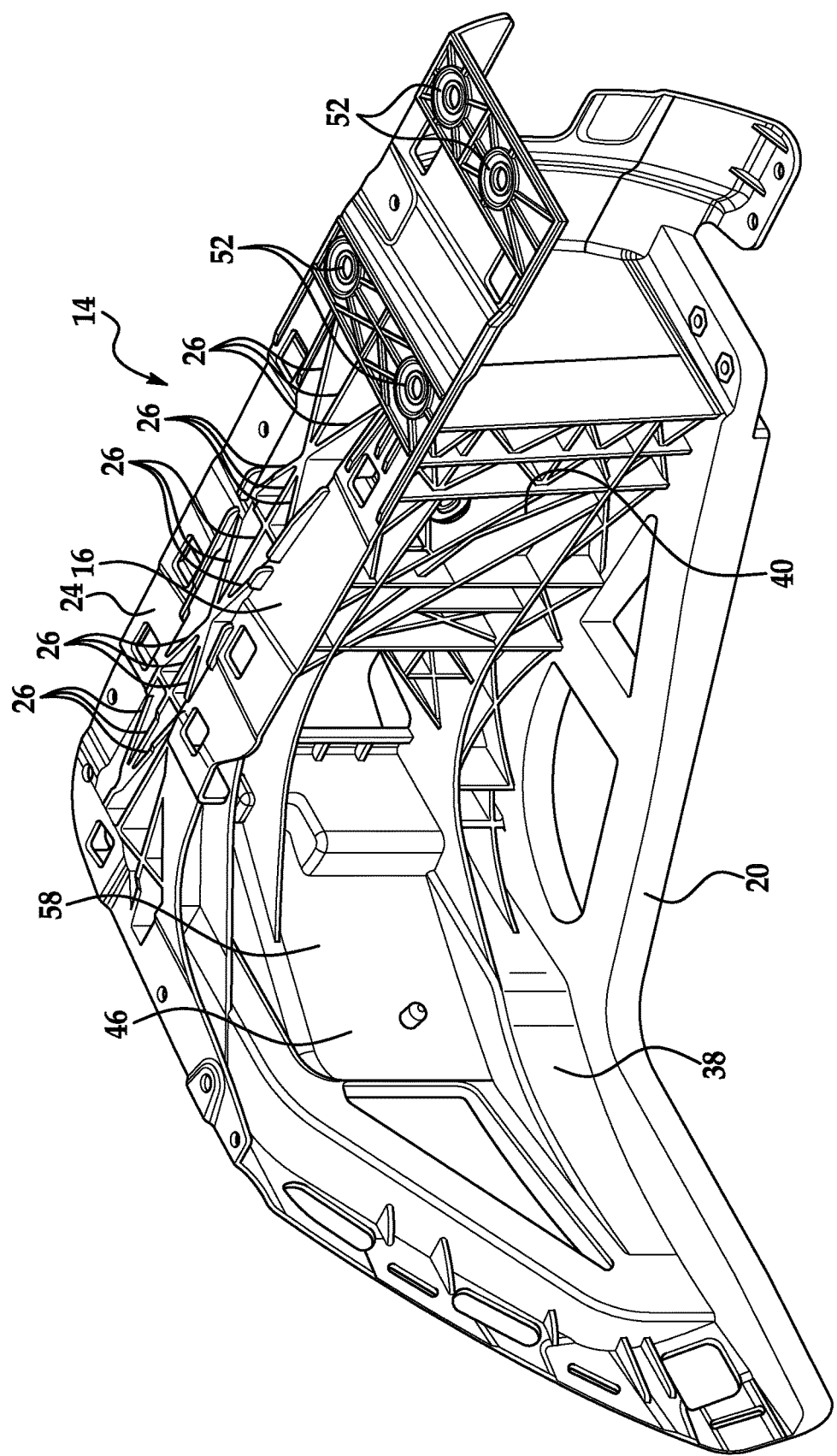
FIG. 1 is a front isometric view of one embodiment of the polymeric bumper reinforcement for the present disclosure.
Figure 2:
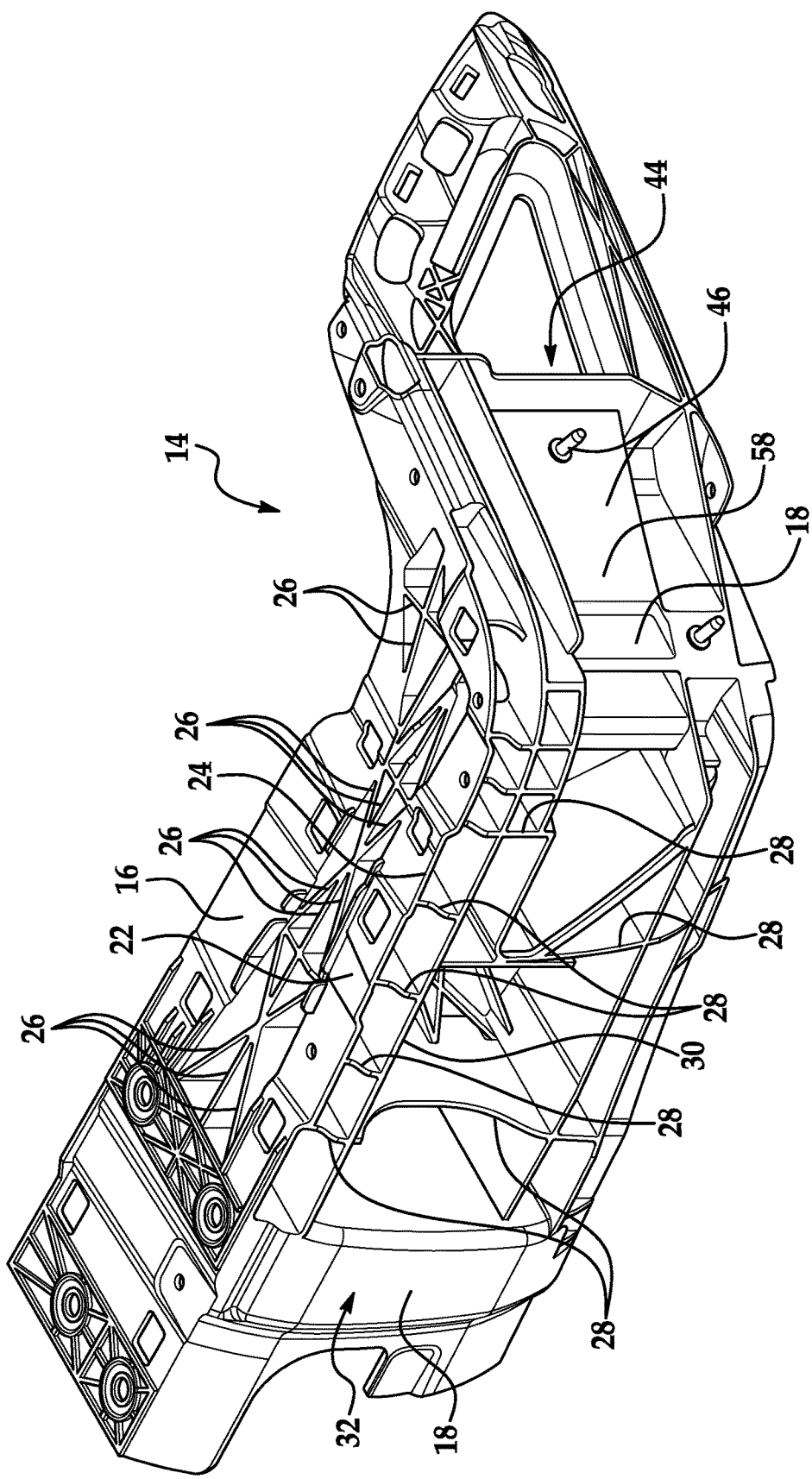
FIG. 2 is a rear isometric view of one embodiment of the polymeric bumper reinforcement for the present disclosure.
Figure 3:
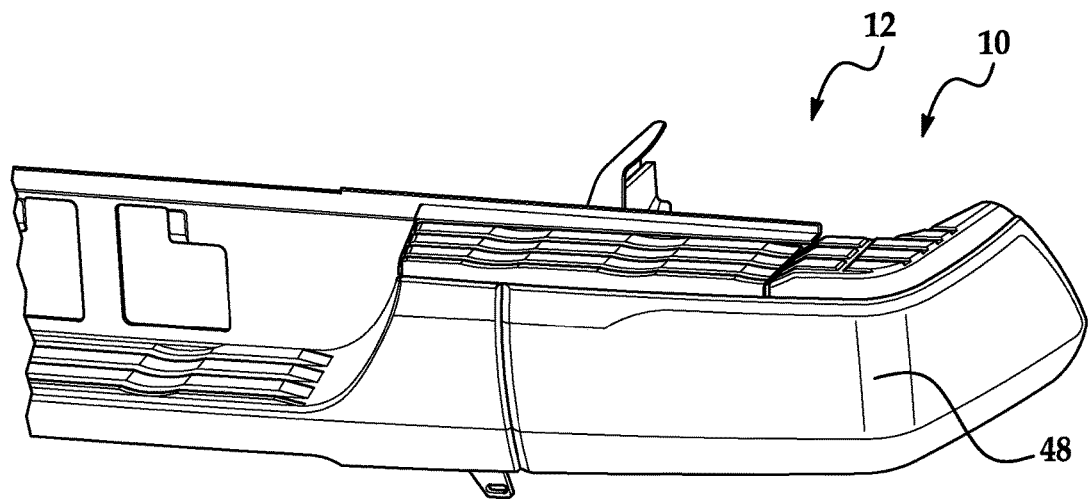
FIG. 3 is a rear view of the blind spot monitor arrangement for a truck bumper.
Figure 4:
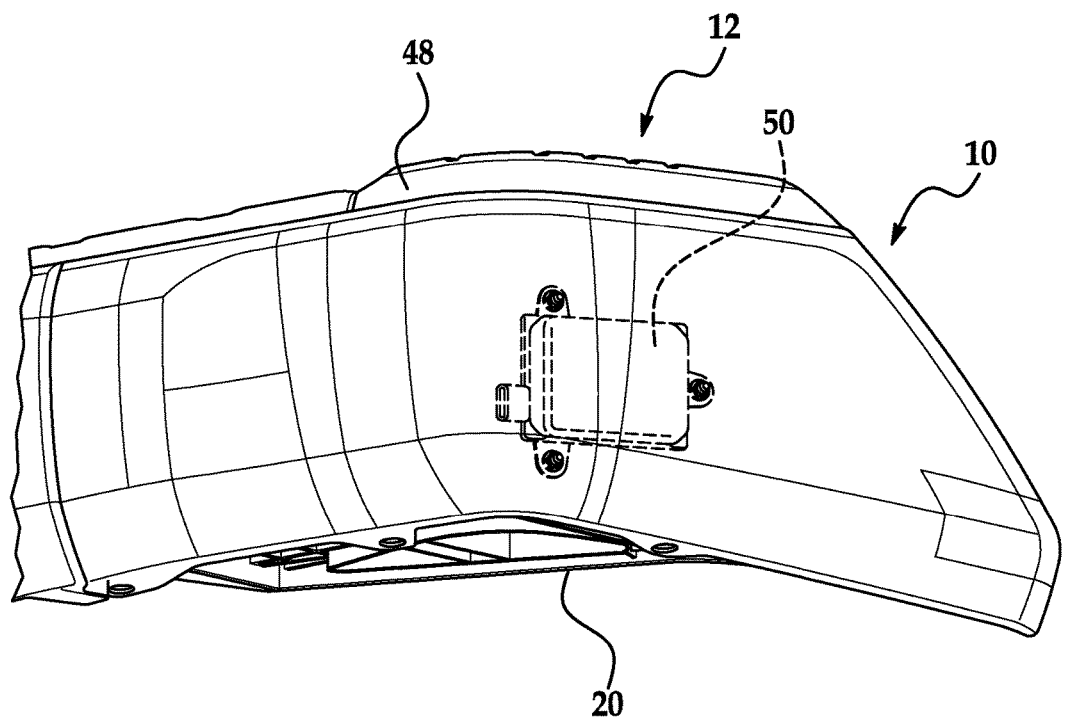
FIG. 4 is an isometric rear view blind spot monitor arrangement for a truck bumper with the blind spot monitor shown in phantom.

A blind spot monitor arrangement 10 for a (truck) bumper is shown in FIGS. 3-7. As shown, the blind spot monitor arrangement 10 includes a polymeric bumper reinforcement 14 having a blind spot monitor 50 mounted thereon. The polymeric bumper reinforcement 14 includes a substantially horizontal surface 16, a substantially vertical face 18 and a lower reinforcement arm 20. The substantially horizontal surface 16 including a rear portion 22 defining a horizontal flange 24. Furthermore, the substantially horizontal surface 16 includes upstanding integral ribs 26 formed in a portion of the substantially horizontal surface 16 (adjacent to the horizontal flange 24) as shown in FIGS. 1 and 2. The substantially vertical face 18 is integral to the substantially horizontal surface 16 as shown in FIGS. 1 and 2. The substantially vertical face 18 includes side ribs 30 and vertical ribs 28 defined on a rear face 32 of the polymeric bumper reinforcement 14 and an integrated sensor bracket 46 formed on an outer side face of the polymeric bumper reinforcement.

The lower reinforcement arm 20 is substantially parallel to the substantially parallel horizontal surface. The lower reinforcement arm 20 is integral to and connecting the lower end 40 of the rear face 32 and the bottom end 38 the outer face 44. As indicated, the blind spot monitor 50 is mounted to the integrated sensor bracket 46 and a bumper cover 48 (FIGS. 3-7) encloses the blind spot monitor 50 and the polymeric bumper reinforcement 14 as shown in FIGS. 1-6.

Figure 5:
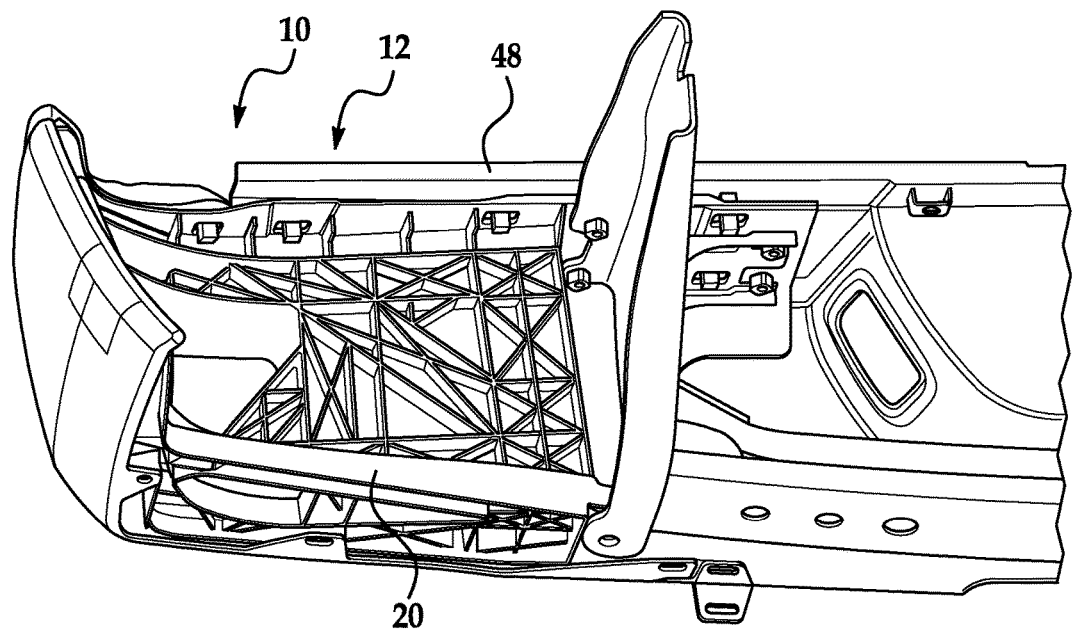
FIG. 5 is a front view of the blind spot monitor arrangement for a truck bumper where the reinforcement attaches to the vehicle frame.
Figure 6:
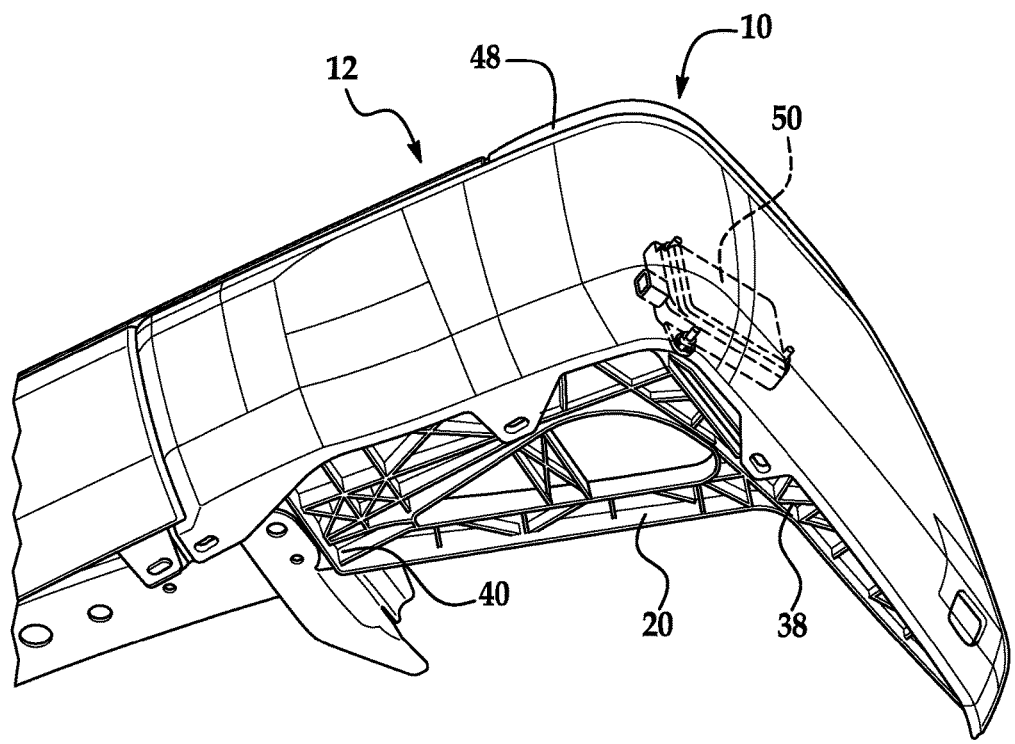
FIG. 6 is a bottom view of the blind spot monitor arrangement for a truck bumper.
Figure 7:
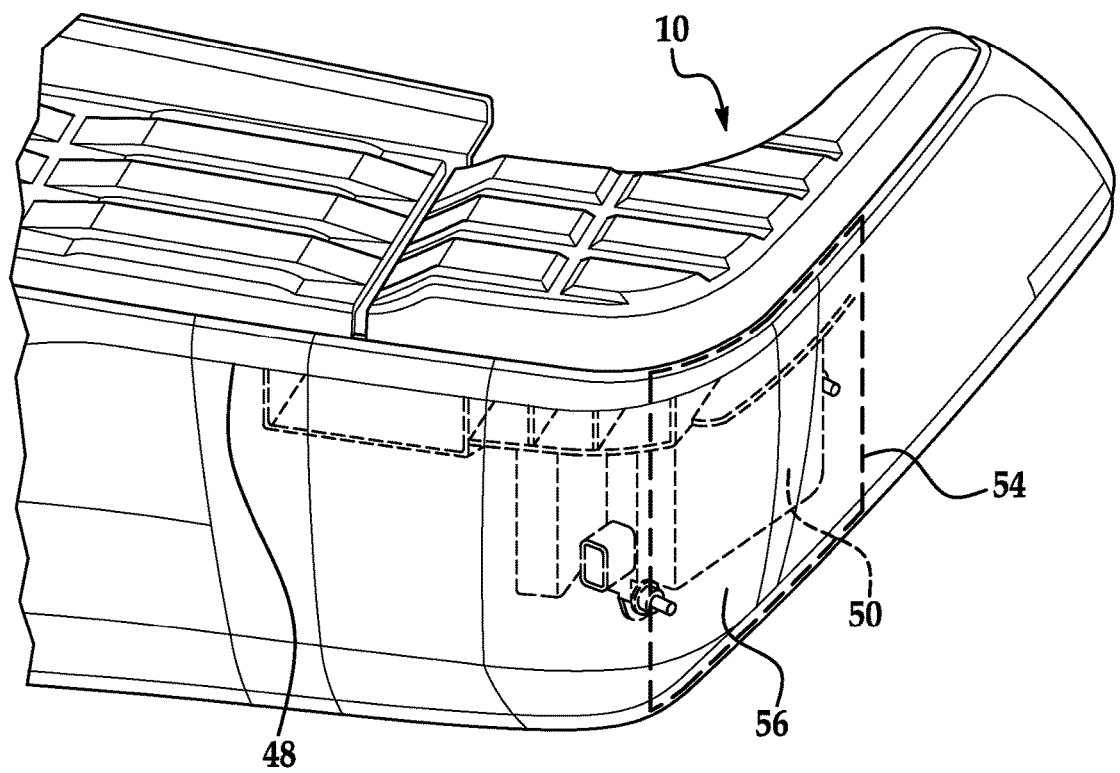
FIG. 7 is an isometric view of the blind spot monitor arrangement for a truck bumper where the plug and monitor are shown in phantom.

As shown in FIGS. 2, 5, and 7, the polymeric bumper reinforcement 14 includes a substantially horizontal surface 16 which is adapted to receive a bumper cover 48 via openings 52 defined in the polymeric bumper reinforcement. The bumper cover and the substantially horizontal surface 16 are operatively configured to support a vertical load when a user steps onto the bumper 12.

As is commonly seen in pick-up trucks, the bumper cover 48 may be made from a metal material (chrome) and the bumper cover 48 defines an aperture 54 to accommodate the blind spot monitor 50. However, the bumper cover 48 (when metal) may further implement a plastic plug 56 to close the aperture 54 as shown in FIG. 7. The plastic plug 56 may be affixed to the periphery of the aperture 54 in a variety of ways, including but not limited to a snap-fit arrangement or a heat-staked attachment.

The benefit of a plastic plug 56 is that the plastic plug 56 prevents metal bumper cover 48 from interfering with the blind spot monitor 50. Nonetheless, it is also to be understood that the bumper cover 48 may also be made from a polymeric material which usually is color coded to match the outer sheet metal of the vehicle.

As shown in FIG. 2, the substantially vertical face 18 of the polymeric bumper reinforcement 14 further includes a plurality of side ribs 30 which are connected to and integral to each other via a plurality of vertical ribs 28. Furthermore, the integrated sensor bracket 46 of polymeric bumper reinforcement 14 includes a flat panel 58 integral to the polymeric bumper reinforcement 14.

It is to be understood that alternative embodiments for the blind spot monitor arrangement 10 for a bumper 12 may include a polymeric bumper reinforcement 14 having a variety of energy absorbing structures formed therein yet still maintaining a proper mounting structure for the blind spot monitor 50 in conjunction with a polymeric panel or plug 56 adjacent to the blind spot monitor 50.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A blind spot monitor arrangement for a truck bumper comprising:
   a polymeric bumper reinforcement having:
      a substantially horizontal surface wherein a rear portion includes a horizontal flange; and adjacent to the horizontal flange, the substantially horizontal surface includes upstanding integral ribs formed in a portion of the substantially horizontal surface;
      a substantially vertical face integral to the substantially horizontal surface, the substantially vertical face including a plurality of vertical ribs on a rear face of the polymeric bumper reinforcement and an integrated sensor bracket formed on an outer side face of the polymeric bumper reinforcement; and
      a lower reinforcement arm substantially parallel to the substantially horizontal surface, the lower reinforcement arm integral to and connecting a lower end of the rear face to a bottom end of a right face;
   a blind spot monitor mounted to the integrated sensor bracket; and
   a bumper cover enclosing the blind spot monitor and the polymeric bumper reinforcement.

2. The blind spot monitor arrangement of claim 1 wherein the substantially horizontal surface is adapted to receive a cover wherein the cover and the substantially horizontal surface are operatively configured to support a vertical load when a user steps onto the vehicle bumper.

3. The blind spot monitor arrangement of claim 1 wherein the bumper cover is made from a metal material and the bumper cover defines an aperture to accommodate the blind spot monitor and the bumper cover further including a plastic plug to close the aperture.

4. The blind spot monitor arrangement of claim 1 wherein the substantially horizontal surface of the polymeric bumper reinforcement further includes a plurality of horizontal ribs which are connected to and integral to each other via the plurality of vertical ribs.

5. The blind spot monitor arrangement of claim 1 wherein the integrated sensor bracket of polymeric bumper reinforcement includes a flat panel integral to the polymeric bumper reinforcement.

6. The blind spot monitor arrangement of claim 1 wherein the bumper cover is a polymeric material.

7. The blind spot monitor arrangement of claim 3 wherein the plastic plug is affixed to the bumper cover via a snap-fit.

8. The blind spot monitor arrangement of claim 3 wherein the plastic plug is affixed to the bumper cover via a heat stake.

9. A blind spot monitor arragnement for a truck bumper comprising:
   a polymeric bumper reinforcement having an intergrated sensor bracket formed on an outer side face of the polymeric bumper reinforcement;

a blind spot monitor mounted to the intefrated sensor bracket; and a bumper cover enclosing the blind spot monitor and the polymeric bumper reinforcement.

10. A blind spot monitor arrangement of claim 9, wherein the bumper cover is made from a metal material and the bumper cover defines an aperture to accommodate the blind spot monitor and the bumper cover further including a plastic plug to close the asperture.

11. The blind spot monitor arrangement of claim 9 wherein the integrated sensor bracket of the polymeric bumper reinforcement includes a flat panel intergral to the polymeric bumper reinforcement.

12. The blind spot monitor arrangement of claim 9 wherein the bumper cover is a polymeric material.

13. The blind spot monitor arrangement of claim 10 wherein the plastic plug is affixed to the bumper cover via a snap-fit.

14. The blind spot monitor arrangement of claim 10 wherein the plastic plug is affixed to the bumper cover via a heat stake.

* * * * *

UNITED STATES PATENT AND TRADEMARK OFFICE
CERTIFICATE OF CORRECTION

PATENT NO. : 9,682,675 B2  Page 1 of 1
APPLICATION NO. : 14/841554
DATED : June 20, 2017
INVENTOR(S) : Steven Perucca et al.

It is certified that error appears in the above-identified patent and that said Letters Patent is hereby corrected as shown below:

Claim 9, Column 4, Line 63: delete "arragnement" and insert therefore -- arrangement --

Claim 9, Column 4, Line 65: delete "intergrated" and insert therefore -- integrated --

Claim 9, Column 5, Line 1: delete "intefrated" and insert therefore -- integrated --

Claim 10, Column 5, Line 5: delete "A" and insert therefore -- The --

Claim 10, Column 5, Line 9: delete "asperture" and insert therefore -- aperture --

Claim 11, Column 5, Line 12: delete "intergral" and insert therefore -- integral --

Signed and Sealed this
Third Day of October, 2017

Joseph Matal
*Performing the Functions and Duties of the*
*Under Secretary of Commerce for Intellectual Property and*
*Director of the United States Patent and Trademark Office*